(12) United States Patent
Hong

(10) Patent No.: US 6,957,441 B2
(45) Date of Patent: Oct. 18, 2005

(54) OPTICAL DISC CARRIER ASSEMBLY INCLUDING A DISC CARRIER INTEGRALLY FORMED WITH A ROTOR OF THE SPINDLE MOTOR

(75) Inventor: Yin-Rong Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 53 days.

(21) Appl. No.: 10/618,612

(22) Filed: Jul. 15, 2003

(65) Prior Publication Data

US 2004/0095878 A1 May 20, 2004

(51) Int. Cl.[7] .................. G11B 17/028; G11B 17/03; G11B 19/20
(52) U.S. Cl. ........................................... 720/695
(58) Field of Search .................. 720/695, 658, 720/696, 703, 715; 369/266, 264, 258.1; 360/98.07, 99.04, 99.08

(56) References Cited

U.S. PATENT DOCUMENTS

| 6,477,001 B1 | * | 11/2002 | Yang et al. | ............... 360/99.08 |
| 2002/0113503 A1 | * | 8/2002 | Nagatsuka | ................ 310/67 R |

\* cited by examiner

Primary Examiner—Julie Anne Watko
(74) Attorney, Agent, or Firm—Bacon & Thomas, PLLC

(57) ABSTRACT

A disc carrier assembly for a spindle motor for an optical disc drive includes a rotor and a disc carrier. The rotor includes an end wall and a peripheral wall. The end wall has a central hole. The disc carrier includes a main plate having an inner side and an outer side. The inner side of the main plate is in intimate contact with the end wall of the rotor. The main plate includes an engaging portion on the inner side thereof. The engaging portion includes an axial hole through which a shaft is securely extended, allowing joint rotation of the disc carrier and the shaft. The engaging portion further includes an annular groove for securely receiving a peripheral wall portion delimiting the central hole of the end wall of the rotor, allowing joint rotation of the disc carrier and the rotor.

5 Claims, 2 Drawing Sheets

OPTICAL DISC CARRIER ASSEMBLY INCLUDING A DISC CARRIER INTEGRALLY FORMED WITH A ROTOR OF THE SPINDLE MOTOR

BACKGROUND OF THE INVENTION

1. Field of the Invention

The present invention relates to a disc carrier assembly for a spindle motor for an optical disc drive. In particular, the present invention relates to a disc carrier assembly for a spindle motor with improved rotational stability.

2. Description of Related Art

FIG. 3 is a sectional view of a conventional spindle motor for an optical disc drive. The spindle motor includes a circuit board 90 having a hole through which an axial tube 92 extends. A coil 93 is mounted around the axial tube 92, and a shaft 94 is rotatably extended through the axial tube 92. A support member 91 is mounted to a lower end of the axial tube 92 and provides a support for a lower end of the shaft 94. A rotor 95 is securely engaged, by tight fitting, around the shaft 94 to turn therewith, and a ring magnet 96 is fixed to an inner periphery of the rotor 95. A disc carrier 97 is fixed, by tight fitting, to an upper end of the shaft 94 to turn therewith. An optical disc may be placed on the disc carrier 97 and turns together with the disc carrier 97 when the shaft 94 turns. However, since the disc carrier 97 and the rotor 95 are both fixed to the shaft 94 by tight fitting and spaced apart from each other, the assembling procedure is troublesome. Further, it was found that the optical disc rotated in an unstable, skew manner.

OBJECTS OF THE INVENTION

An object of the present invention is to provide a disc carrier assembly for a spindle motor that can be easily manufactured by means of integrally forming the rotor and the disc carrier.

Anther object of the present invention is to provide a disc carrier assembly for a spindle motor with improved rotational stability.

SUMMARY OF THE INVENTION

To achieve the aforementioned objects, the present invention provides a disc carrier assembly for a spindle motor for an optical disc drive, the disc carrier assembly comprising a rotor and a disc carrier. The rotor includes an end wall and a peripheral wall. A permanent ring magnet is fixed to an inner periphery of the peripheral wall. The end wall has a central hole. The disc carrier includes a main plate having an inner side and an outer side. The inner side of the main plate is in intimate contact with the end wall of the rotor. The main plate includes an engaging portion on the inner side thereof. The engaging portion includes an axial hole through which a shaft is securely extended, allowing joint rotation of the disc carrier and the shaft. The engaging portion further includes an annular groove for securely receiving a peripheral wall portion delimiting the central hole of the end wall of the rotor, allowing joint rotation of the disc carrier and the rotor.

In an embodiment of the invention, the central hole of the end wall of the rotor and the annular groove of the disc carrier are non-circular. The main plate further includes an annular wall formed on the outer side thereof. The annular wall surrounds the axial hole and defines a receiving compartment. A metal washer and a magnetic ring are securely received in the receiving compartment. The metal washer is mounted around an end of the shaft and sandwiched between the magnetic ring and the upper side of the main plate. The end wall of the rotor further includes a stepped portion along a periphery thereof. The main plate includes an annular rib formed on the inner side thereof for engaging with the stepped portion of the end wall of the rotor.

In an alternative embodiment, the disc carrier and the rotor are integrally formed as a one-piece member.

Other objects, advantages and novel features of this invention will become more apparent from the following detailed description when taken in conjunction with the accompanying drawings.

DETAILED DESCRIPTION OF THE PREFERRED EMBODIMENT

Figure 1:
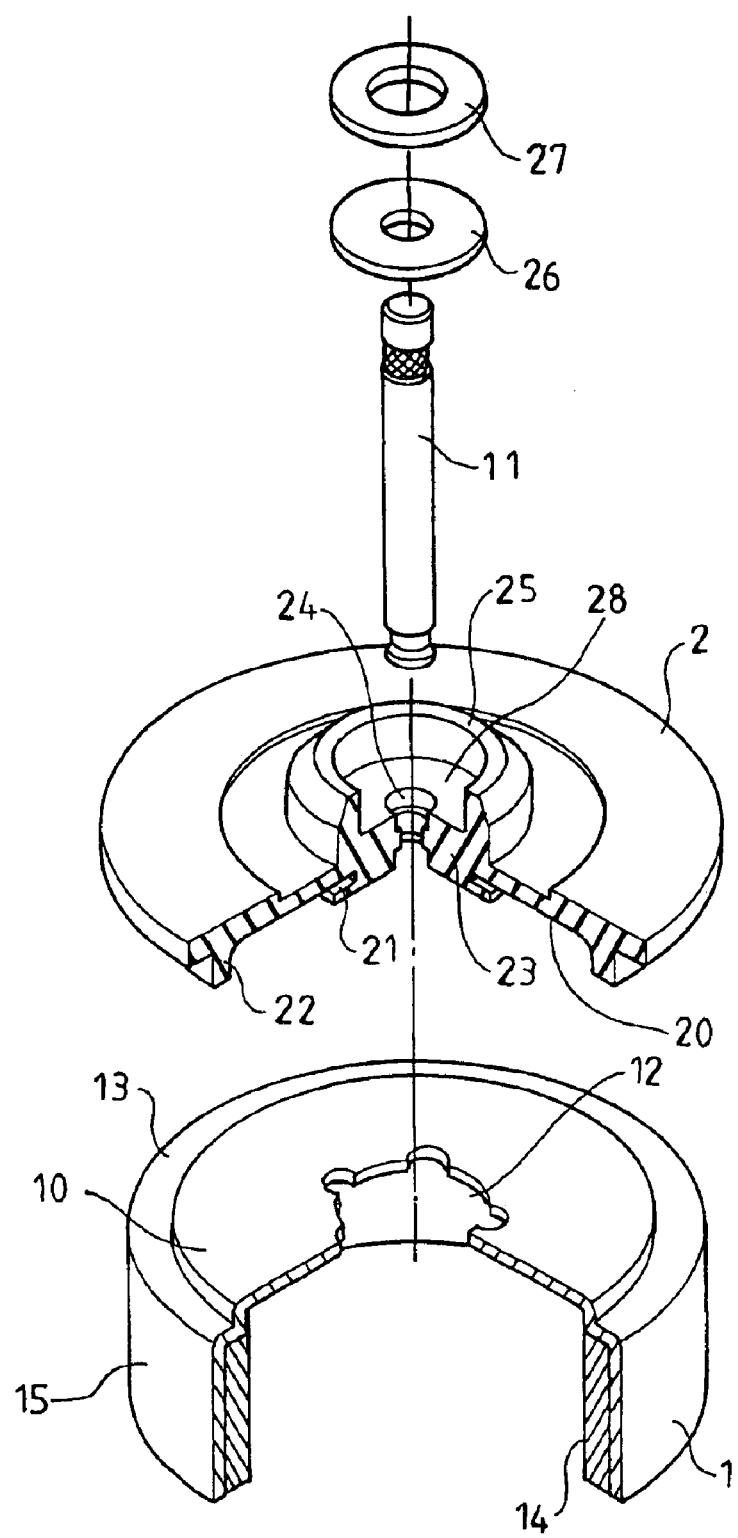
FIG. 1 is an exploded perspective view, partly cutaway, of a disc carrier assembly in accordance with the present invention.

A preferred embodiment of the present invention is now to be described hereinafter in detail, in which the same reference numerals are used in the preferred embodiments for the same parts as those in the prior art to avoid redundant description.

Figure 2:
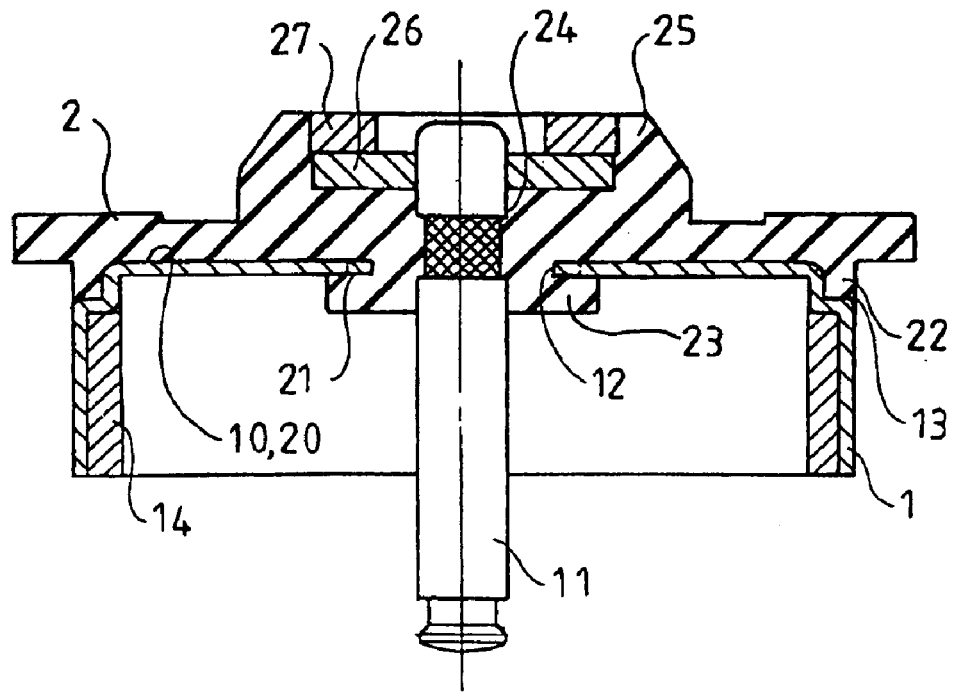
FIG. 2 is a sectional view of the disc carrier assembly in accordance with the present invention.
Figure 3:
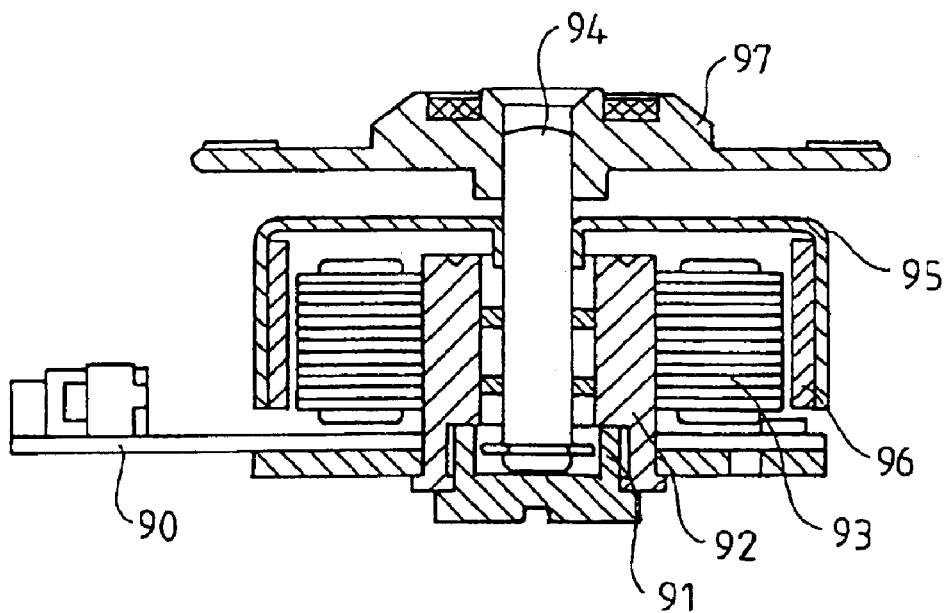
FIG. 3 is a sectional view of a conventional spindle motor.

Referring to FIGS. 1 and 2, a disc carrier assembly for a spindle motor for an optical disc drive in accordance with the present invention includes a rotor 1 having an end wall 10 and a peripheral wall 15 projecting from a side of the end wall 10. A central hole 12 is defined in a central portion of the end wall 10, and a permanent ring magnet 14 is fixed to an inner periphery of the peripheral wall 15. Operation of the permanent ring magnet 14 is conventional and therefore not described in detail. Preferably, the central hole 12 is non-circular. The end wall 10 of the rotor 1 includes a stepped portion 13 along a periphery thereof.

The disc carrier 2 includes a main plate 20 in intimate contact with the end wall 10 of the rotor 1. An engaging portion 23 is formed on an inner side of the main plate 20 and has an axial hole 24 through which a shaft 11 is securely extended, allowing joint rotation of the disc carrier 2 and the shaft 11. The engaging portion 23 further has an annular groove 21 defined in an outer periphery thereof. An annular wall 25 is formed on an outer side of the main plate 20 and surrounds the axial hole 24, the annular wall 25 defining a receiving compartment 28 for receiving a metal washer 26 and a magnetic ring 27. The main plate 21 further includes an annular rib 22 on the inner side thereof. Preferably, the annular groove 21 of the engaging portion 23 of the main plate 21 is non-circular and configured to be complimentary to a peripheral wall portion delimiting the central hole 12 of the end wall 10 of the rotor 1.

In assembly, the engaging portion 23 of the disc carrier 2 is extended through the central hole 12 of the end wall 10, with the peripheral wall portion delimiting the central hole 12 of the end wall 10 being securely received in the annular groove 21 of the engaging portion 23 of the disc carrier 2. Thus, the disc carrier 2 and the rotor 1 are engaged together to turn jointly. The annular rib 22 of the main plate 21 is engaged with the stepped portion 13 of the rotor 1. This increases the engaging area between the disc carrier 2 and the rotor 1. Alternatively, the disc carrier 2 and the rotor 1 are integrally formed as a one-piece member.

The shaft 11 is extended through the axial hole 24 of the main plate 21, with an end of the shaft 11 being located in the receiving compartment 28 delimited by the annular wall 25. As illustrated in FIG. 2, the metal washer 26 is engaged around the end of the shaft 11, and the magnetic ring 27 is mounted on an upper side of the metal washer 26; i.e., the metal washer 26 is sandwiched between the upper side of the main plate 21 and the magnetic ring 27. When the annular wall 25 is engaged with an elevator type balancing means (not shown) of an optical disc drive, a reliable magnetic attraction effect is provided.

After assembly, when the shaft 11 turns as a result of magnetic induction between the permanent ring magnet 14 and the stator (not shown), the rotor 1 and the disc carrier 2 turn together. An optical disc (not shown) may be releasably mounted on the disc carrier 2 to turn therewith. It is noted that skew rotation of the disc carrier 2 relative to the rotor 1 would not occur, which is particularly true when the disc carrier 2 and the rotor 1 are integrally formed as a one-piece member.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A disc carrier assembly for a spindle motor for an optical disc drive, the disc carrier assembly comprising:
   a rotor including an end wall and a peripheral wall, a permanent ring magnet being fixed to an inner periphery of the peripheral wall, the end all having a central hole; and
   a disc carrier including a main plate having an inner side and an outer side, the inner side of the main plate being in intimate contact with the end wall of the rotor, the main plate including an engaging portion on the inner side thereof, the engaging portion including an axial hole through which a shaft is securely extended, allowing an annular groove for securely receiving a peripheral wall portion delimiting the central hole of the end wall of the rotor, allowing joint rotation of the disc carrier and the rotor,
   wherein the main plate further includes an annular wall formed on the outer side thereof, the annular wall surrounding the axial hole and defining a receiving compartment, the main plate further including a metal washer and a magnetic ring securely received in the receiving compartment, the metal washer being mounted around an end of the shaft and sandwiched between the magnetic ring and the upper side of the main plate.

2. The disc carrier assembly as claimed in claim 1, wherein the central hole of the end wall of the rotor and the annular groove of the disc carrier are non-circular.

3. The disc carrier assembly as claimed in claim 2, wherein the end wall of the rotor further includes a stepped portion along a periphery thereof; the main plate including an annular rib formed on the inner side thereof for engaging with the stepped portion of the end wall of the rotor.

4. The disc carrier assembly as claimed in claim 1, wherein the disc carrier and the rotor are integrally formed as a one-piece member.

5. The disc carrier assembly as claimed in claim 1, wherein the end wall of the rotor further includes a stepped portion along a periphery thereof, the main plate including an annular rib formed on the inner side thereof for engaging with the stepped portion of the end wall of the rotor.

* * * * *